(12) United States Patent
Fair

(10) Patent No.: US 11,951,338 B2
(45) Date of Patent: Apr. 9, 2024

(54) FALL PROTECTION MONITOR

(71) Applicant: Textron Innovations, Inc., Providence, RI (US)

(72) Inventor: Darren Fair, Newton, KS (US)

(73) Assignee: Textron Innovations Inc., Providence, RI (US)

( * ) Notice: Subject to any disclaimer, the term of this patent is extended or adjusted under 35 U.S.C. 154(b) by 1274 days.

(21) Appl. No.: 16/540,293

(22) Filed: Aug. 14, 2019

(65) Prior Publication Data

US 2020/0054903 A1 Feb. 20, 2020

Related U.S. Application Data

(60) Provisional application No. 62/718,658, filed on Aug. 14, 2018.

(51) Int. Cl.
| | | |
|---|---|---|
| A62B 35/00 | (2006.01) |
| B66C 7/16 | (2006.01) |
| B66C 15/04 | (2006.01) |
| B66F 17/00 | (2006.01) |
| F16P 3/00 | (2006.01) |
| G01L 5/04 | (2006.01) |
| G08B 21/02 | (2006.01) |

(52) U.S. Cl.
CPC ...... *A62B 35/0025* (2013.01); *A62B 35/0043* (2013.01); *A62B 35/0075* (2013.01); *B66C 7/16* (2013.01); *B66C 15/045* (2013.01); *B66F 17/006* (2013.01); *F16P 3/00* (2013.01); *G01L 5/04* (2013.01); *G08B 21/02* (2013.01); *B66C 2700/084* (2013.01)

(58) Field of Classification Search
CPC ... A62B 35/0043; A62B 35/0075; B66C 7/16; B66C 15/045; B66C 17/006; B66C 2700/084
See application file for complete search history.

(56) References Cited

U.S. PATENT DOCUMENTS

| | | | | |
|---|---|---|---|---|
| 4,919,283 A | * | 4/1990 | Riley | B66C 19/002 212/324 |
| 10,138,102 B2 | | 11/2018 | Baillargeon et al. | |
| 2002/0186299 A1 | * | 12/2002 | Cofer | F16P 3/142 340/541 |

(Continued)

FOREIGN PATENT DOCUMENTS

| | | |
|---|---|---|
| EP | 0179252 A2 | 4/1986 |
| WO | 02101279 A1 | 12/2002 |

*Primary Examiner* — Mohammad Ali
*Assistant Examiner* — Vincent W Chang
(74) *Attorney, Agent, or Firm* — Avek IP, LLC

(57) ABSTRACT

Personnel working at elevated positions use safety lines to prevent falls. Equipment being used in proximity to the personnel may interfere with the safety lines presenting a potential hazard. A fall protection monitor provides an automated and wireless sensor system for avoiding interactions between equipment and safety lines. The fall-protection monitor includes a first sensor for monitoring whether a safety line is in operation. A second sensor monitors a location of a moveable device being used in the vicinity of the safety line. A controller determines the location of the moveable device and whether the safety line is in operation. The controller prevents movement of the moveable device within a predetermined distance from an operational safety line.

16 Claims, 3 Drawing Sheets

(56) References Cited

U.S. PATENT DOCUMENTS

| | | | |
|---|---|---|---|
| 2010/0070179 A1* | 3/2010 | Cameron | G01S 5/0027 |
| | | | 701/300 |
| 2012/0217091 A1 | 8/2012 | Baillargeon et al. | |
| 2013/0153333 A1* | 6/2013 | Richards | B66F 11/04 |
| | | | 182/113 |
| 2015/0027808 A1* | 1/2015 | Baillargeon | A62B 35/0025 |
| | | | 182/19 |
| 2015/0161872 A1* | 6/2015 | Beaulieu | B66C 13/40 |
| | | | 340/686.6 |
| 2016/0354621 A1* | 12/2016 | Moore, Jr. | A62B 35/0075 |
| 2017/0369288 A1* | 12/2017 | Fulton | G05B 19/0426 |
| 2018/0107169 A1* | 4/2018 | Hu | A62B 35/0093 |
| 2018/0126198 A1* | 5/2018 | Troy | B66F 11/044 |
| 2020/0206928 A1* | 7/2020 | Denenberg | G01S 17/04 |
| 2020/0255267 A1* | 8/2020 | Wong | B60Q 5/005 |
| 2022/0134149 A1* | 5/2022 | Carlson | B66F 17/003 |
| | | | 340/573.1 |
| 2023/0039118 A1* | 2/2023 | Ching | A62B 35/0025 |

\* cited by examiner

FALL PROTECTION MONITOR

CROSS-REFERENCE TO RELATED APPLICATIONS

This application claims the benefit of U.S. Provisional Application No. 62/718,658 entitled "Fall Protection Monitor" and filed on Aug. 14, 2018, which is herein incorporated by reference in its entirety.

BACKGROUND

1. Field

Embodiments of this disclosure relate generally to the field of manufacturing safety, and more specifically to wireless sensor technology applied to personnel safety during manufacturing operations.

2. Description of the Related Art

Many safety line technologies have been described. For example, U.S. Pat. No. 10,138,102 and U.S. Patent Application Publication No. 2012/0217091, both sharing the common inventor Baillargeon, are each directed to a warning and message delivery and logging system utilizable in a fall arresting and prevention device. More specifically, the Baillargeon systems uses sensors to detect the state of an operator on a safety line along with an alarm system. WIPO Patent Publication No. 2002101279 to Cofer is directed to a machine safety system including a mutual exclusion zone that may potentially include operators and a machine. European Patent No. 0179252 to Rosch is directed to a method and system for protecting people in the operating range of a movable part of a traversing or swiveling machine, particularly in the range of an industrial robot.

SUMMARY

In an embodiment, a fall-protection monitor includes a safety line mechanically coupled to an overhead support structure. The safety line has a user attachment point that is suspended above a workspace. A first sensor is adapted to monitor a location of the attachment point. A second sensor is adapted to monitor a location of a moveable member. The moveable member is adapted to move with respect to the overhead support structure. A controller is adapted to determine whether the safety line is in operation based on information from the first sensor and to determine the location of the moveable member based on information from the second sensor. The controller is adapted to prevent movement of the moveable member within a predetermined distance from the safety line when the safety line is in operation.

In another embodiment, a safety system for preventing accidents is provided. The safety system includes a first sensor adapted to monitor whether a retractable safety line is in operation. A second sensor is adapted to monitor a location of manufacturing equipment. A controller is adapted to automatically determine whether the retractable safety line is in operation based on information from the first sensor and to automatically determine the location of the manufacturing equipment based on information from the second sensor such that the controller prevents movement of the manufacturing equipment within a predetermined distance from the retractable safety line when the retractable safety line is in operation.

BRIEF DESCRIPTION OF THE SEVERAL VIEWS OF THE DRAWINGS

Illustrative embodiments of the present disclosure are described in detail below with reference to the attached drawing figures, which are incorporated by reference herein and wherein.

Figure 1:
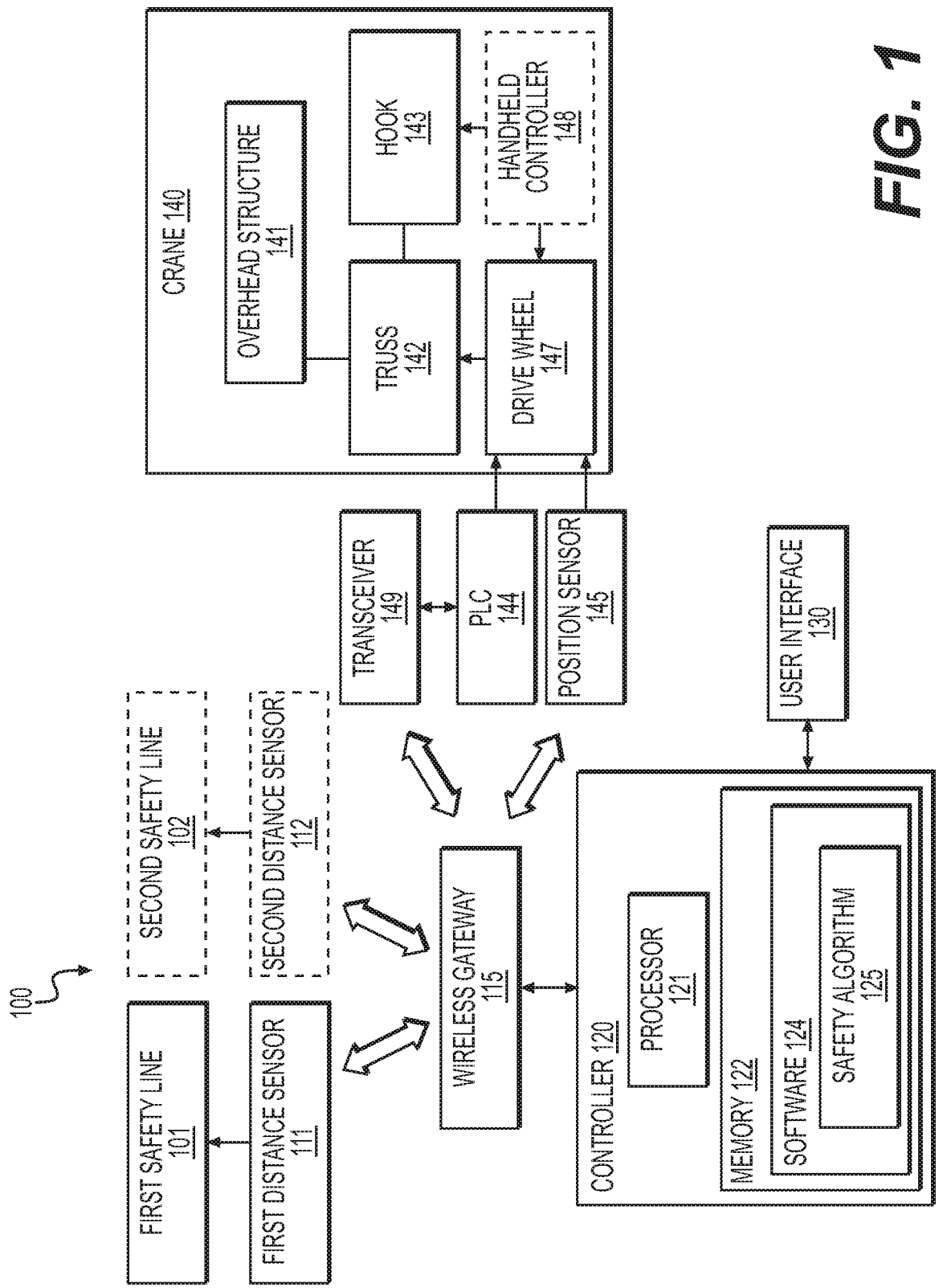
FIG. 1 is a block diagram showing a fall-protection monitor, in an embodiment.

The drawing figures do not limit the invention to the specific embodiments disclosed and described herein. The drawings are not necessarily to scale, emphasis instead being placed upon clearly illustrating the principles of the invention.

DETAILED DESCRIPTION

During some manufacturing operations (e.g., aircraft manufacturing), personnel may be working at elevated positions that present a fall potential, requiring those individual to be attached to a safety rope or line. Manufacturing equipment, such as overhead cranes, may be in simultaneous operation within the same workspace, creating a potential for the equipment to interfere with the individual's safety line. Embodiments of the present disclosure provide a monitoring system that uses sensors and wireless communication devices to automatically monitor the location of the safety lines while in use and simultaneously monitor the crane location to avoid any interactions for protecting personnel during manufacturing operations.

FIG. 1 is a block diagram showing components of an exemplary fall-protection monitor 100. A first safety line 101 is used for preventing accidents such as preventing a user from falling from an elevated position. An example of first safety line 101 is a safety retractable lifeline (SRL), which includes a retractable cable that may be slowly released to enable intentional movement by the user, but which halts upon a rapid movement by the user to prevent a fall. First safety line 101 mechanically couples to an overhead support structure or an elevated member above a workspace. As used herein the term "workspace" refers to any area in which a user may be working. For example, the workspace is may be a designated area within a building or hangar. Alternatively, the workspace may be a designated area outdoors, and a crane, lift, boom, tower, or aerial device is used to support the elevated member or overhead support structure for suspending the first safety line 101 above the workspace.

Figure 2:
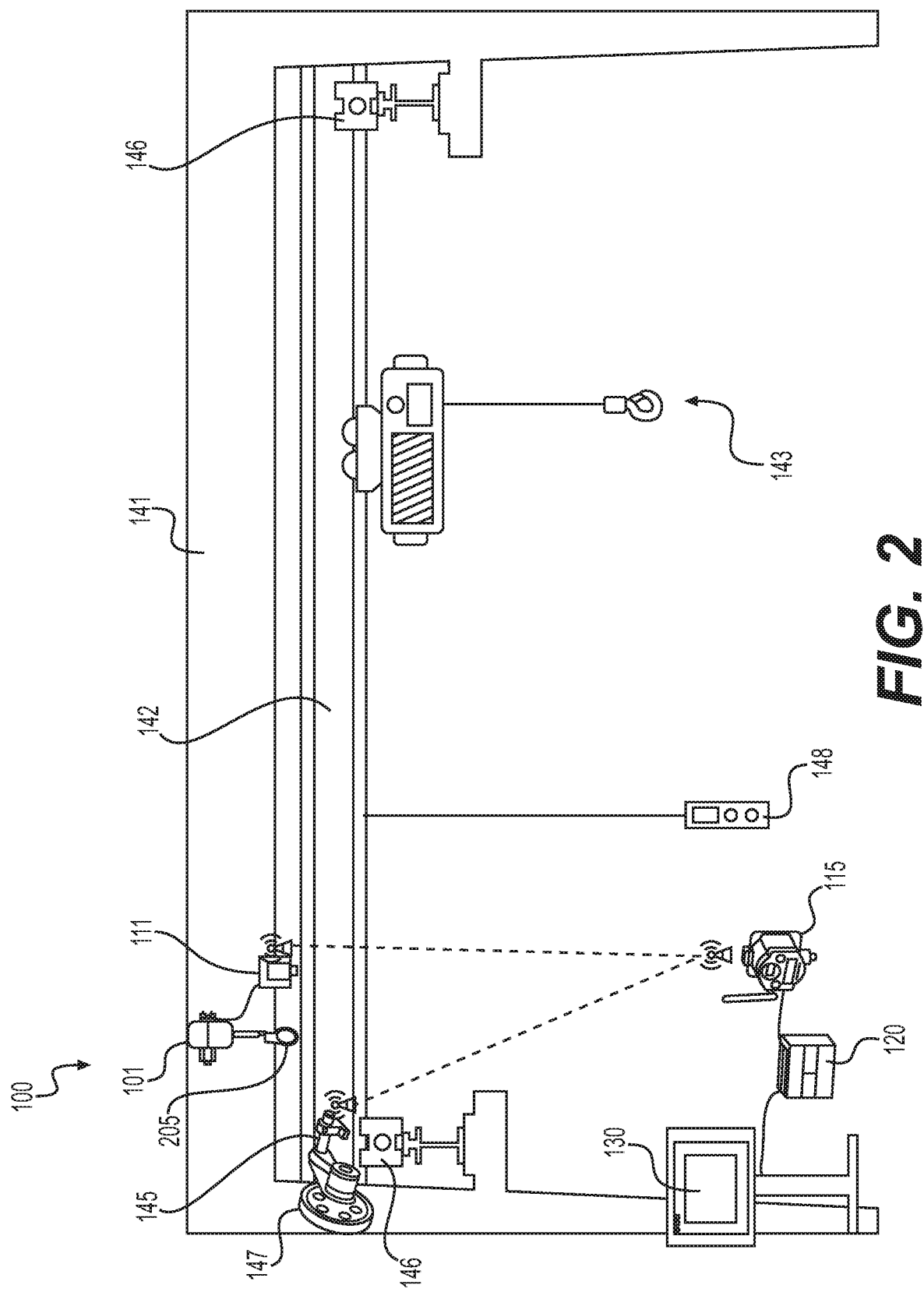
FIG. 2 is a schematic diagram showing an exemplary arrangement of the fall-protection monitor of FIG. 1, in an embodiment.

The user may wear a harness adapted for mechanically coupling with first safety line 101 via a user attachment point 205 (see FIG. 2). User attachment point 205 is for example a snap hook or carabiner fixed to a lower end of the retractable cable of safety line 101 and adapted to connect/disconnect from the user's harness. At an upper end, first safety line 101 mechanically couples to the overhead support structure or elevated member. Examples of overhead support structure include support structures for a roof of a building/hangar as well as cranes and towers. Examples of the elevated member include a rafter, rail, truss, or beam (e.g., as part of, or mechanically coupled with, a support structure for a roof of a building/hangar). Alternatively, the elevated member is an arm, beam or truss of a crane, tower or aerial device. In certain embodiments, the upper end of first safety line 101 may be slidably coupled with the overhead support structure or elevated member (e.g., via a wheel, ring or pulley) to enable first safety line 101 to be moved along the rail by the user, as further described below in connection with FIG. 3. In certain embodiments, the user is positioned on top of an aircraft (e.g., on an upper side of a wing, fuselage, stabilizer, etc.) and a rail is mechanically coupled between rafters of the ceiling in a manufacturing building (e.g., an aircraft hangar). The rail is positioned above a portion of the aircraft to enable the user to move about that portion while maintaining fall protection via first safety line 101.

A first distance sensor 111 is coupled with first safety line 101. For example, first distance sensor 111 is positioned adjacent safety line 101 via a bracket. First distance sensor 111 is for example a wireless diffused photoelectric sensor capable of functioning as a non-contact proximity sensor. First distance sensor 111 is pointed at user attachment point 205 of first safety line 101 and outputs information related to a distance from attachment point 205. Based on the distance information, it may be determined whether attachment point 205 is retracted or extended. If attachment point 205 is retracted, this indicates that first safety line 101 is not in use. Otherwise, attachment point 205 is extended indicating that first safety line 101 is in use. In certain embodiment, first distance sensor 111 provides distance information to a controller (e.g., controller 120, described below) that determines whether or not a user is currently using first safety line 101. For example, if the distance information provided by first distance sensor 111 exceeds a predetermined threshold, controller 120 determines that first safety line 101 is currently in operation.

Figure 3:
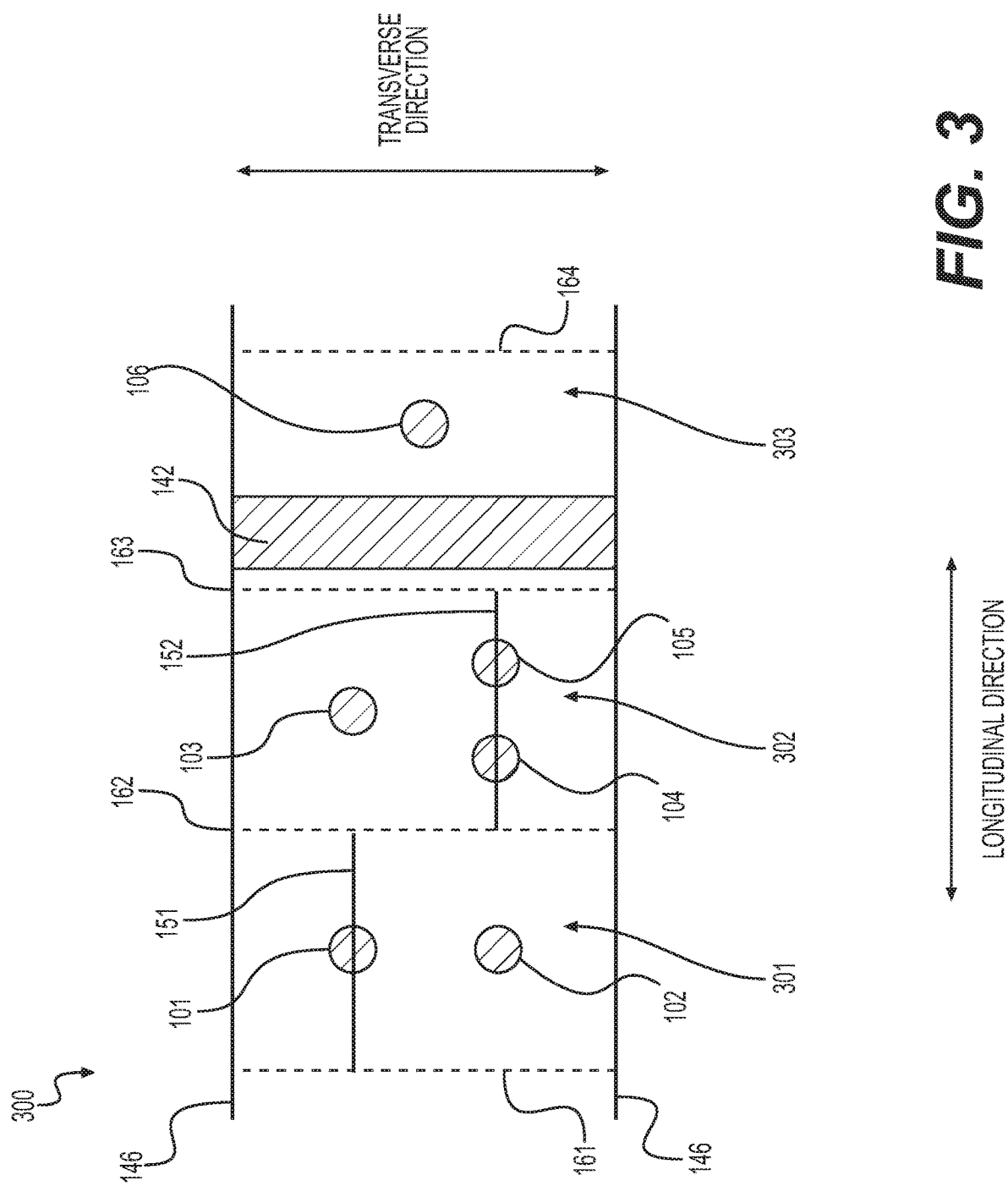
FIG. 3 is a schematic diagram showing a top-down view of a workspace for using the fall-protection monitor of FIG. 1, in an embodiment.

In certain embodiments, additional safety lines may be installed with additional sensors, respectively. For example, an optional second safety line 102 is shown in FIG. 1, and a plurality of safety lines 101-106 are shown in FIG. 3. The additional safety lines may be attached to elevated members or overhead support structures in a fixed manner. Alternatively, safety lines 101-106 may be moveably coupled to the elevated members or overhead support structures for enabling the user or users to move while maintaining a substantially vertical orientation of the safety line thereby preventing swinging in the event of a fall. In certain embodiments, the user may move within the workspace and transfer from one safety line to the next, as further described below in connection with FIG. 3.

A wireless gateway 115 is communicatively coupled with first distance sensor 111 and optional second distance sensor 112 via a wireless communication medium for providing bidirectional wireless communication. The sensors are adapted with a transceiver for transmitting and receiving wireless communication signals. In certain embodiments, wireless gateway 115 is a router or integrated access device (IAD) that contains a plurality of input/output interfaces in order to wirelessly interface with wireless transceivers including wirelessly-adapted sensors and a controller 120, via a WiFi or Bluetooth wireless standard for example. In some embodiments, wireless gateway includes a web service application programing interface (API) client for handling Internet communication. Wireless gateway 115 may be adapted to identify which sensor (e.g., first distance sensor 111, second distance sensor 112, etc.) is wirelessly uploading data.

Controller 120 includes a memory 122 for storing software 124 having machine readable instructions executed by a processor 121. Controller 120 is for example one or more of a computer, a microcontroller, a programmable logic controller (PLC), and a programmable automation controller, coupled with control circuitry, such as one or more printed circuit boards for example. Memory 122 in some embodiments is a memory system that includes both transitory memory such as RAM and non-transitory memory such as, ROM, EEPROM, Flash-EEPROM, magnetic media including disk drives, and optical media. Memory 122 stores software 124 as machine readable instructions executable by processor 121 to process data from first distance sensor 111 and optionally additional sensors (e.g., second distance sensor 112) via wireless gateway 115. For example, software 124 may include a safety algorithm 125 that provides instructions to process data from first distance sensor 111 and second distance sensor 112.

A user interface 130 is communicatively coupled with controller 120 to enable a user to provide input and receive information from controller 110. The user interface may include a display communicatively coupled with an input device such as a mouse, keyboard, microphone, or touchscreen. In certain embodiments, user interface 130 is adapted to display a real-time view of which safety lines are in operation and a location of those safety lines (e.g., by displaying an overhead schematic diagram of the workspace, as depicted in FIG. 3).

FIG. 2 is a schematic diagram showing an exemplary arrangement of fall-protection monitor 100, FIG. 1. Items enumerated with like numerals are the same or similar and their description may not be repeated accordingly. FIGS. 1 and 2 are best viewed together with the following description.

A crane 140 is for example a gantry crane having an overhead structure 141 adapted to straddle a workspace (e.g., a bridge crane). Crane 140 is an example of manufacturing equipment that has a moveable device which may be used overhead of personnel. Other manufacturing equipment compatible for use with system 100 include aerial devices, booms, lifts, and cable/pulley systems. In certain embodiments, crane 140 includes a truss 142 supported by overhead structure 141. Overhead structure 141 may be integrated with, or part of, the building structure (e.g., rafters supporting a ceiling of the building). Truss 142 is an example of a moveable member or moveable device that may be adapted for moving along rails 146 of overhead structure 141 via a drive wheel 147. The term "truss" as used hereinafter can be any sort of structural configuration and should not be limited to any particular framework, rafter, post, strut, boom, arm, bridge, or any other sort of structural component unless otherwise specified elsewhere in the claims. In certain embodiments, a hook 143 is attached to truss 142 and is adapted for moving cargo (e.g., aircraft components) within the workspace and for raising/lowering the cargo via a cable. Hook 143 is moveable in a transverse direction along truss 142. In a longitudinal direction, perpendicular to the transverse direction (e.g., see FIG. 3), hook 143 and truss 142 move along rails 146. An operator may control hook 143 and truss 142 by inputting commands via an optional handheld controller 148.

Embodiments of the present disclosure are adapted to protect personnel working in the workspace from manufacturing equipment, especially when personnel are working in elevated positions with safety line 101 due to the possible interaction between the manufacturing equipment and safety line 101. In certain embodiments, user interface 130 is adapted to show a real-time position of truss 142 with respect to different zones within the workspace (e.g., by displaying an overhead schematic diagram of the workspace, as depicted in FIG. 3).

Returning to FIG. 1, a programmable logic controller (PLC) 144 is used for controlling movement of truss 142. PLC 144 includes transitory and non-transitory memory for storing software or firmware and a processor for executing instructions of the software/firmware. A transceiver 149 transmits and receives wireless signals for providing wireless communication between PLC 144 and controller 120 via wireless gateway 115.

A position sensor 145 is for example a rotary position sensor adapted to measure angular rotation of an axle or shaft. Exemplary rotary position sensors include rotary variable differential transformers (RVDTs), rotary encoders, multiturn encoders, synchros, resolvers, and potentiometers. Position sensor 145 may be adapted to provide rotational position information of drive wheel 147 that drives truss 142. Alternatively, position sensor 145 is adapted to measure position of an independent wheel (not shown) instead of drive wheel 147 for providing improved accuracy due to slippage of drive wheel 147.

Position information from position sensor 145 may be provided continuously (e.g., via an analog signal) or at regular intervals (e.g., a digital signal at a processor rate). Wireless communication between position sensor 145 and wireless gateway 115 may be via an internal transceiver within position sensor 145 or optionally via transceiver 149 without departing from the scope hereof. In some embodiments, controller 120 may send a request for information from position sensor 145 at any instance or according to any schedule. Based on information from position sensor 145, controller 120 may determine a position of truss 142 along overhead structure 141. For example, controller 120 may determine (e.g., via safety algorithm 125) the zone in which truss 142 is presently located, as well as when truss 142 is approaching a transition between zones.

In certain embodiments, user interface 130 is adapted to show a real-time position of truss 142, first safety line 101, second safety line 102, and any additional safety lines (see FIG. 3) with respect to different zones within the workspace (e.g., using an overhead schematic diagram of the workspace, such as workspace 300, FIG. 3). User interface 130 may provide warning or caution notifications to personnel. For example, user interface 130 may include an alerting mechanism to produce an alert such as a display device, a speaker system, a headphone worn by the user, light sources, or other similar alerting mechanisms, which may be independent from, or incorporated within, user interface 130. In some embodiments, user interface 130 includes controls for moving truss 142 and one or more buttons for raising/lowering hook 143 (e.g., instead of, or in addition to, handheld controller 148). User interface 130 enables a user of fall-protection monitor 100 an opportunity to override controller 120 for customizing equipment movement while providing fall protection to personnel.

FIG. 3 is a schematic diagram showing a top-down view of a workspace 300 for using fall-protection monitor 100, FIG. 1. Workspace 300 is located beneath truss 142 and in between rails 146. Truss 142 is aligned in the transverse direction and is supported between rails 146, which are aligned in the longitudinal direction. Truss 142 may move along rails 146, which are aligned in the longitudinal direction.

The operator of fall-protection monitor 100 may be a different individual than the user of monitor 100. For example, while the user is working at an elevated position within workspace 300, the operator may be stationed on the ground with user interface 130, either within or outside of workspace 300.

User interface 130 may display the schematic diagram shown in FIG. 3, or a similar diagram illustrating workspace 300, such that an operator may visualize the real-time location of equipment and users within workspace 300 for monitoring and avoiding unsafe conditions.

A plurality of zones may be designated within workspace 300, which are illustrated with dashed lines in FIG. 3. For example, workspace 300 may include a first zone 301, a second zone 302, and a third zone 303, although greater than three or fewer than three zones may be designated without departing from the scope hereof. A size and location of the zones may be based on the location, range and number of safety lines as well as other considerations of the workspace and/or the manufacturing process. In some embodiments, the zones of workspace 300 are determined based on rafters in the ceiling of the building. For example, in the embodiment depicted in FIG. 3, first zone 301 is between a first rafter 161 and a second rafter 162, second zone 302 is between second rafter 162 and a third rafter 163, and third zone 303 is between third rafter 163 and a fourth rafter 164.

In the embodiment depicted in FIG. 3, workspace 300 includes six safety lines 101, 102, 103, 104, 105, and 106. The safety lines may be stationary (e.g., safety lines 101, 103, and 106 are stationary in FIG. 3). Alternatively, the safety lines may be moveable (e.g., along rails). For example, first safety line 101 may be moveable along a first rail 151 located in first zone 301 (e.g., between the first pair of rafters) and a fourth safety line 104 and a fifth safety line 105 may be moveable along a second rail 152 located in second zone 302. Each zone may include more than one rail without departing from the scope hereof. For example, a zone may include parallel rails, perpendicular rails, curved rails or any other arrangement of rails useful for user navigation.

Since first and second rails 151, 152 are located above rails 146 of crane 140, truss 142 may interact with the safety lines when in use unless proper monitoring is performed to avoid any conflicts, as described herein.

In operation, controller 120 determines whether or not one or more safety lines are in operation and a position of truss 142 in the longitudinal direction within workspace 300. When the truss moves within the vicinity of an operational safety line, e.g., within a predetermined distance from a safety line in use, controller 120 produces a warning to the operator and halts movement of the truss. Specifically, when a safety line is in operation within the predetermined distance, controller 120 communicates a command to PLC 144, which halts drive wheel 147 to prevent truss 142 from further movement.

In certain embodiments, a plurality of zones are designated within workspace 300 (e.g., zones 301, 302, 302 depicted in FIG. 3). Controller 120 is adapted to prevent movement of the moveable device (e.g., truss 142) within any one of the plurality of zones in which a retractable safety line is currently in use. A warning or caution indicator may be provided to notify personnel (e.g., via user interface 130) when an operational safety line is in a zone adjacent to the zone in which truss 142 is located. Likewise, if controller 120 determines that first safety line 101 is in operation in first zone 301 an operational status is updated (e.g., the operational status is updated to "in use" or "in operation"). Accordingly, when an operator moves the truss 142 towards first zone 301, controller 120 may first provide a caution notice to the operator (e.g., via user interface 130 and/or additional alerting mechanisms). When the truss 142 is within a predetermined limit of first zone 301, controller 120 halts movement of truss 142 (e.g., via PLC 144 and drive wheel 147) prior to entry of truss 142 into first zone 301 and personnel (e.g., the user and the operator) are notified.

In certain embodiments, controller 120 may determine when a potentially unsafe condition is being approached before halting movement of truss 142. For example, based on information provided by position sensor 145, controller may determine when truss 142 is approaching a predetermined limit. The predetermined limit may be set in controller 120 for triggering a warning to notify an operator of hook 143 that a potentially unsafe condition is being approached. As used herein, "limit" means a value, ratio, equation, or other expression. In other words, the limit may be predetermined, set, fixed, or variable. In certain embodiments, the limit is a predetermined distance, which may be set by the operator via user interface 130 based on one or more operational factors. Exemplary operational factors used to determine the limit include the type of manufacturing task being performed, the number of safety lines in use, a size of the zones in the workspace, or other constraints on the tasks being performed by personnel in the workspace. The safety algorithm 125 may be used by controller 120 to provide instructions for determining the limit based on operational factors, inputs from the user, or other safety considerations.

In certain embodiments, the user may switch between safety lines while working in workspace 300. For example, while connected to first safety line 101, the user approaches second safety line 102 and connects to second safety line 102 before disconnecting from first safety line 101. In this manner, the user may move across zones in the transverse direction or between zones in the longitudinal direction while maintaining protection from at least one safety line at all times. Since each safety line is equipped with a sensor (e.g., first and second distance sensors 111, 112), which is used to determine whether a respective safety line is in operation, controller 120 continually updates which safety lines are in operation. For example, controller 120 updates the operational status of the first and second safety lines 101 so that each safety line is appropriately identified as "in use" or "not in use".

Current manufacturing practice relies on the crane operator to visually observe personnel attached to safety lines within the workspace and to manually stop movement of the truss/hook to avoid unsafe situations. Advantages provided by the presently disclosed embodiments include that the fall-line monitoring is automated which increases its reliability and reduces the likelihood of unsafe situations.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and sub-combinations are of utility and may be employed without reference to other features and sub-combinations and are contemplated within the scope of the claims. Not all steps listed in the various figures need be carried out in the specific order described.

What is claimed is:

1. A fall-protection monitor, comprising:
   a safety line mechanically coupled to an overhead support structure, the safety line having a user attachment point, wherein the user attachment point is suspended above a workspace;
   a first sensor adapted to monitor a location of the attachment point;
   a second sensor adapted to monitor a location of a moveable member, the moveable member being adapted to move with respect to the overhead support structure;
   a controller adapted to determine whether the safety line is in operation based on information from the first sensor and to determine the location of the moveable member based on information from the second sensor; and
   the controller is adapted to prevent movement of the moveable member within a predetermined distance from the safety line when the safety line is in operation.

2. The fall-protection monitor of claim 1, wherein the safety line is a safety retractable lifeline that includes a retractable cable for coupling the user attachment point to the overhead support structure, wherein the retractable cable halts upon a rapid movement by the user.

3. The fall-protection monitor of claim 1, wherein the first sensor is a distance sensor positioned adjacent the safety line for providing information to the controller about a distance to the user attachment point.

4. The fall-protection monitor of claim 1, further comprising a drive wheel adapted to drive movement of the moveable member.

5. The fall-protection monitor of claim 4, further comprising a programmable logic controller adapted for controlling movement of the moveable member via the drive wheel.

6. The fall-protection monitor of claim 4, wherein the second sensor is a rotary position sensor adapted to provide rotational position information of the drive wheel to the controller, such that the controller determines a position of the moveable member based on the rotational position information of the drive wheel.

7. The fall-protection monitor of claim 5, further comprising a wireless gateway adapted for providing bidirectional wireless communication between the controller and the programmable logic controller, the first sensor, and the second sensor.

8. The fall-protection monitor of claim 1, wherein a plurality of zones are designated within the workspace and the controller is adapted to determine a zone in which the moveable member is presently located.

9. The fall-protection monitor of claim 1, wherein the controller is adapted to determine when the moveable member is approaching a predetermined limit.

10. The fall-protection monitor of claim 1, further comprising a user interface adapted to display a diagram of the workspace that illustrates a real-time position of the moveable member and any safety lines currently in use.

11. A safety system for preventing accidents, comprising:
    a first sensor adapted to monitor whether a retractable safety line is in operation;
    a second sensor adapted to monitor a location of manufacturing equipment;
    a controller adapted to automatically determine whether the retractable safety line is in operation based on information from the first sensor and to automatically determine the location of the manufacturing equipment based on information from the second sensor such that the controller prevents movement of the manufacturing equipment within a predetermined distance from the retractable safety line when the retractable safety line is in operation; and a user interface, wherein the predetermined distance is set by an operator of the safety system via the user interface based on a manufacturing task being performed by the user.

12. The safety system of claim 11, comprising a workspace, wherein the workspace comprises a plurality of zones, and the controller is adapted to prevent movement of the manufacturing equipment within any one of the plurality of zones in which the retractable safety line is currently in use.

13. The safety system of claim 11, wherein a user switches from a first retractable safety line to a second retractable safety line for moving through a workspace, and the controller updates an operational status of the first and second retractable safety lines accordingly.

14. The safety system of claim 11, wherein the user interface is adapted to display a diagram of a workspace and identify the location of the retractable safety line and the manufacturing equipment, and to indicate and whether the retractable safety line is operational.

15. The safety system of claim 11, wherein the user interface provides caution indications when the manufacturing equipment is moving in a first zone towards an adjacent second zone having an operational safety line.

16. The safety system of claim 11, wherein the user interface halts movement of the manufacturing equipment when approaching an operational safety line within a predetermined limit.

* * * * *